Feb. 27, 1934.       C. A. LINDBLOM       1,948,822
MULTIPLE SHOE BRAKE
Filed July 11, 1932        2 Sheets-Sheet 1
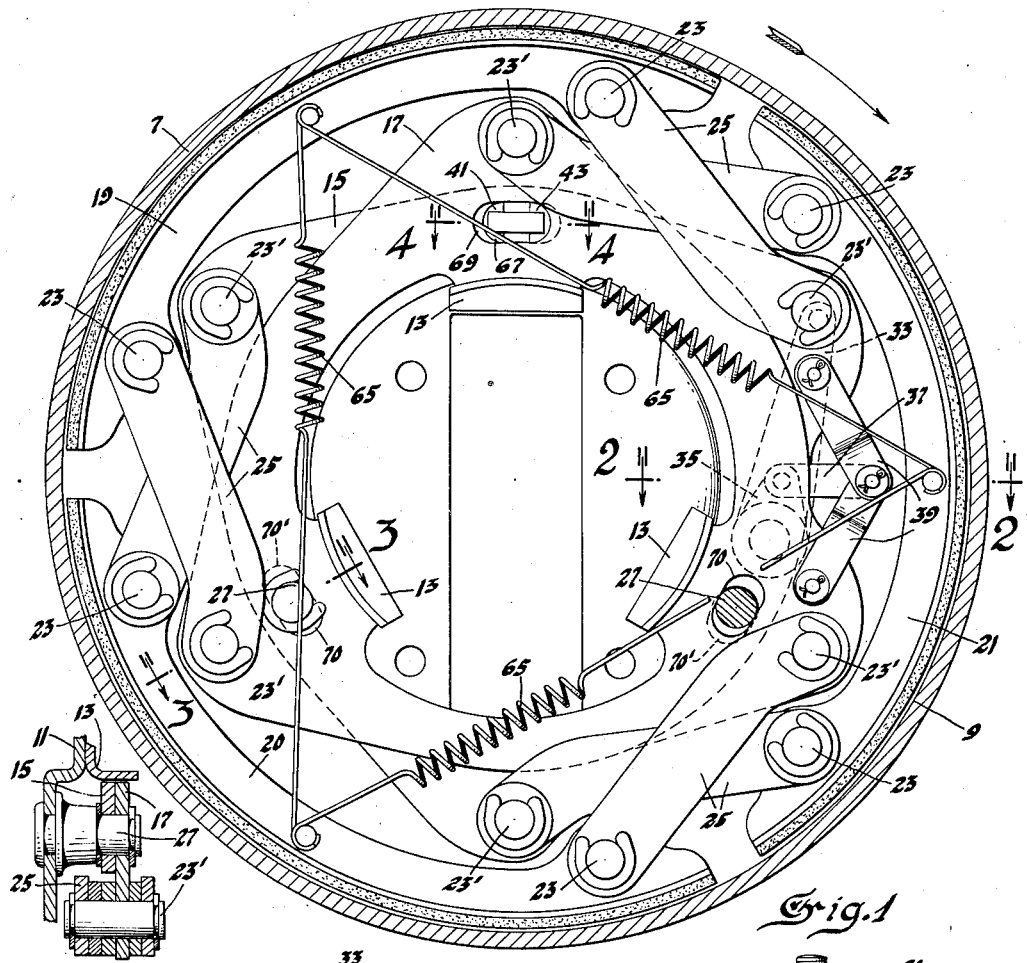
Fig. 1
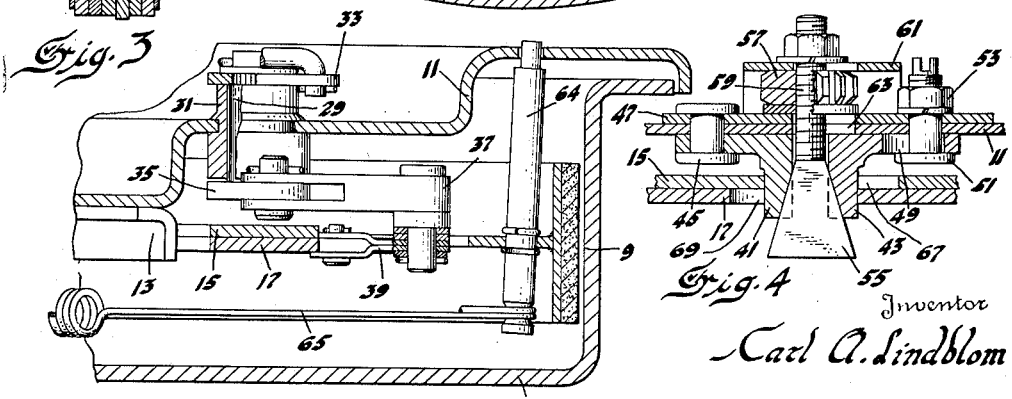
Fig. 3          Fig. 4
Fig. 2
Inventor
Carl A. Lindblom
By Blackmore, Spencer & Flint
Attorneys Feb. 27, 1934.  C. A. LINDBLOM  1,948,822
MULTIPLE SHOE BRAKE
Filed July 11, 1932  2 Sheets-Sheet 2

Inventor
Carl A. Lindblom
By Blackmore, Spencer & Flint
Attorneys

Patented Feb. 27, 1934

1,948,822

UNITED STATES PATENT OFFICE 1,948,822

MULTIPLE SHOE BRAKE

Carl A. Lindblom, Detroit, Mich., assignor to General Motors Research Corporation, Detroit, Mich., a corporation of Delaware Application July 11, 1932. Serial No. 621,804

14 Claims. (Cl. 188—78)

This invention relates to brakes and has been designed as an improved brake for motor vehicles. The invention is of that type employing expanding shoes to engage the internal periphery of a drum.

An object of the invention is to utilize substantially the entire working surface of the drum.

Another object is to utilize the several shoes with equal efficiency when checking forward or reverse travel.

As a still further object the lining wear of the several shoes is equalized.

More specifically an object of the invention is to make use of the known advantages of an articulating anchored shoe by employing a plurality of such shoes jointly acting against substantially the whole drum engaging surface, each of the shoes acting with an articulated anchorage and a predetermined self-actuation, and the action of the several shoes combined being equally efficient for checking both directions of travel.

Other advantages will be understood from the following specification.

The invention is illustrated in the accompanying drawings in which—

Fig. 1 is a section through a brake drum, facing the fixed or backing plate and showing the shoes in elevation.

Fig. 2 is a section on line 2—2 of Fig. 2.

Fig. 3 is a section on line 3—3 of Fig. 1.

Fig. 4 is a section on line 4—4 of Fig. 1.

Figure 5:
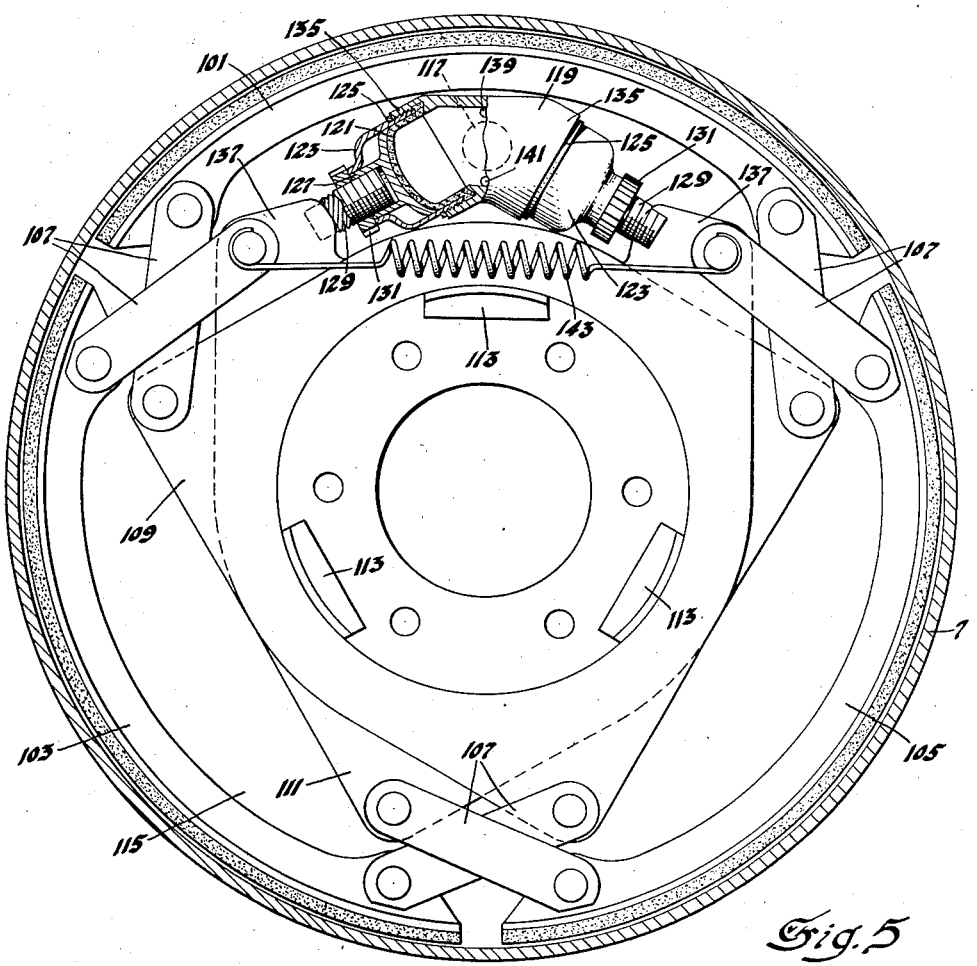
Fig. 5 is a view in elevation of a similar assembly of shoes operated by a fluid pressure means.

In the drawings, the brake drum is represented by numeral 7. It has an inner peripheral shoe engaging surface 9. At 11 is the relatively fixed backing plate, this plate being carried by the steering knuckle in the case of a front wheel and by the axle housing when used with the rear wheel. Secured to the backing plate are guides 13, these guides having arcuate surfaces struck from the center of the drum. Rotatably mounted on these guides are plates 15 and 17, these plates being somewhat triangular in shape as shown by Fig. 1.

There are three brake shoes 19, 20, and 21. Each shoe has a pivot pin 23 at each end. Links 25 are pivoted to the several pivot pins. From any one shoe the links at the two ends extend to and are pivotally connected with the opposed plates 15 and 17. Thus a link 25 connects one end of shoe 19 with plate 15, and the other end of shoe 19 is connected to plate 17 by another link 25. The pivots for the connection of the links with the plates 15 and 17 are designated by reference character 23'. Links 25, extending from the adjacent ends of any two shoes overlap between their connections with the shoes and their connecting points with the plates. In consequence of this construction the plates 15 and 17 may be rotated simultaneously in opposite directions such as to thrust outwardly through the links 25 upon both ends of the shoes and thereby move the shoes into frictional contact with the drum. For the purpose of further guidance of the plates there are provided pins 27 projecting from the backing plate, the two pins shown being at equal distances from the center of the brake drum. These pins project through slots in the plates 15 and 17 to guide the same in their rotary movements about the guides 13.

For the purpose of rotating plates 15 and 17 in opposite directions the following construction is employed: A shaft 29 is rotatably supported in a bushing 31 secured to the backing plate. This shaft 29 has an externally located operating arm 33. Within the drum enclosure the shaft 29 has a relatively short arm 35 which is connected by a link 37 to the junction of other links 39, the remote ends of which links 39 are connected to the plates 15 and 17 as shown in Fig. 1. Since the links 39 are connected one to plate 15 and the other to plate 17, when the links are straightened out plate 15 is rotated in a counter-clockwise direction and plate 17 in a clockwise direction. The counter-clockwise rotation of plate 15 tends to thrust into engagement with the drum through the instrumentality of links 25 one end of each shoe. Similarly the clockwise rotation of plate 17 has the same action upon the other end of each shoe.

The operation as thus explained is substantially the effect of applying the brake when the wheel carried drum is at rest. The action is obviously complicated when the drum is rotating and which rotation must be stopped by the brake mechanism. In that case the rotation of the drum tends to influence the rotation of the shoes. Provision also must be made for lining wear to avoid undue pedal travel when the lining thickness is reduced.

A combined guide and stop device for the rotating movements of plates 15 and 17 is found in the associated parts 41 and 43, these parts together constituting the primary stop. Of these parts 41 is riveted at 45 to the backing plate 11, and also to a reinforcing plate 47. Part 43 has a slot 49 through which an adjusting bolt 51 extends. This bolt also passes through circular openings in the plates 11 and 47 and is provided with an adjusting nut 53. The parts 41 and 43 may be spread apart by a wedge 55 engaging sloping surfaces on these parts 41 and 43. The wedge is moved by a nut 57 threaded on the stem 59 of the wedge. The nut is located on the stem and held between the plate 47 and a bracket 61. The bracket has a slot to accommodate the lateral movement of the wedge when being adjusted, this arrangement being made necessary since the part 43 only is movable. The backing plate 11 and plate 47 are similarly slotted to accommodate the lateral movement of the wedge member, these slots being designated by numeral 63.

Springs 65 are attached at their ends to the adjacent shoes, there being pins 64 anchored to the backing plate and extending through webs of the shoes. To the ends of the pins 64 the springs are connected. These springs operate to release the shoes from their contact with the drum and, in doing so, operate through the links 25 to rotate the plates 15 and 17 in a direction opposite to that imparted to the plates by the brake-applying means including the links 39. In other words, these springs 65 rotate plate 15 clockwise and plate 17 counter-clockwise.

The plates 15 and 17 have slots adjacent the parts 41 and 43. In plate 15 is a slot 67, the left end of which (Fig. 1) anchors on part 41 when, under the influence of the springs, the plate is rotated clockwise as stated. Similarly plate 17 has a slot 69, the right end of which anchors on part 43 as a result of the counter-clockwise rotation imparted to this plate by the brake-releasing springs. To provide for the rotation of plates 15 and 17 relative to the guide pins 27, these plates are also provided with slots adjacent the said pins 27. The slot in plate 17 is designated by numeral 70. This slot must be of such dimensions as to permit not only the movement of the plate in the action of brake applying and releasing but must be also of such dimensions as to accommodate the movement of plate 17 when it is being adjusted by the wedge 55.

For the purpose of making clear the operation of the device when checking the rotation of the drum, it should be stated that the arrow on Fig. 1 represents the rotation of the drum corresponding with forward travel of the vehicle. The straightening of the links 39 at first rotates plate 15 counterclockwise and plate 17 clockwise. In so doing the left end of slot 67 in plate 15 is moved slightly from contact with stop pin 41. Also, the right end of slot 69 in plate 17 is separated from stop 43. At the same time it should be noted that the slot 70 in plate 17 extends beyond the guide pin 27 sufficiently to permit this movement. The underlying slot 70' in plate 15 is also of the necessary dimensions to permit this initial movement of the plates. When the several shoes are thus brought in contact with the drum, the clockwise rotation of the drum as represented by the arrow tends to rotate all said shoes in a clockwise direction. This clockwise direction of the shoes is communicated through the links 25 to produce a similar direction of both plates 15 and 17. Plate 15 is thus rotated against the applied pressure and reengages its stop 41. At this point it may be said that the slots in plate 15 adjacent pins 27 are so dimensioned that simultaneously with reengagement of stop 41 the end of the slots 70' in this plate adjacent pins 27 engage the pins so that the pins 27, together with part 41, constitute a plurality of stops. After the plate 15 is thus held from rotation by the self-actuating force derived from the drum, the applied force is wholly transmitted to the movement of plate 17. The end of plate 15 therefore holds one end of each shoe through the action of the links 25. The movement of plate 17 derived from the applied force and the self-actuating force of drum rotation is communicated through the links 25 to the other ends of each shoe. Each shoe therefore becomes a self-actuating shoe of the articulated link anchored type.

When checking reverse travel an opposite effect takes place. The plate 17, after being turned clockwise by the mechanically-applied force and separating from part 43, is brought back again into contact with stop 43 by the self-actuating force of the drum. In this case plate 17 anchors one end of each shoe, and the applied force operates to press the other end of each shoe into contact with the drum acting through the rotation of plate 15. In this case reliance may not be placed on guide pins 27 as additional stops because, in the act of adjustment, the brake plate 17 has been moved to an extent such that the end of the slot 70 may not engage the guide pin 27 when the end of slot 69 engages the stop 43. The plate 17 therefore engaging part 43 anchors one set of ends of the shoes. The brake-applying force is then operable upon plate 15 which is moved in a counter-clockwise direction both by the applied force and the rotating drum to press the other ends of the shoes against the drum. The slot 67 is made of such length as to permit this movement. It will be seen that the guide pins 27 afford an easy way to supplement the stop 41 for checking forward travel, but it will be clearly understood that these pins may not function as stops for checking the reverse travel in view of the necessity to provide for adjustment of plate 17.

It will thus be seen that there is provided a brake of the internal expanding type wherein a plurality of shoes engage substantially the whole drum surface whether operating to check forward or reverse travel. A brake is provided also wherein there is used in the case of each shoe the well-known articulated link anchorage which may be designed to provide any predetermined self-actuating characteristics, and a brake wherein equalized wear of the several shoes is automatically assured.

In Fig. 5 is shown a similar type of brake operated by fluid pressure. At 101, 103, and 105 are three shoes connected pivotally by links 107 to two plates 109 and 111 in substantially the same way as before. These plates are rotatably supported on arcuate parts 113 secured to the backing plate 115. Also secured to the backing plate is a fluid pressure container 119. Numeral 117 represents any convenient fastening means for the container. This container is preferably an hydraulic cylinder and is closed at its ends by a flexible element 121 secured in position by a cap 123 threaded into engagement with the cylinder 119 in clamping contact with the flange of the flexible element. The inward movement of the cap 123 is limited by a ring 125. Each cap is in effect an extension of the cylinder beyond the flexible element and guides a plunger 127, the outer movement of which is produced by the action of the flexible member 121 under the influence of a fluid medium. Extending into the plunger 127 is a threaded member 129 having a nut 131 threaded thereon and engaging the end of the cap to adjust the member 129 axially of the plunger 127. The engagement of the nut 131 with the cap 123 also serves as a stop. The ends 135 of the cylinder are angularly arranged relative to the mid portion whereby the plungers 127 and the members 129 extend toward extensions 137 provided on the plates 109 and 111, the bifurcated ends of the parts 129 engaging the same.

The operation is substantially the same as before. That one of the plates 109 and 111 which tends to be rotated in opposite directions by the rotating force derived from the drum and by the hydraulic force delivered by the plunger becomes stationary and, through the instrumentality of the links 107, anchors one end of each of the shoes. The other plate is rotated in the same direction both by the hydraulic medium and by the rotating drum and through the links 107 rocks the shoes into firm contact with the drum. In this case the anchor is constituted not by separate abutments but by the engagement of one of the nuts 131 with the extension 123 of the operating cylinder. Suitable openings are provided to supply the hydraulic cylinder with the fluid and to vent the same. These are shown at 139 and 141. A spring 143 is operable to release the plates and thereby the shoes from drum contact.

Figure 6:
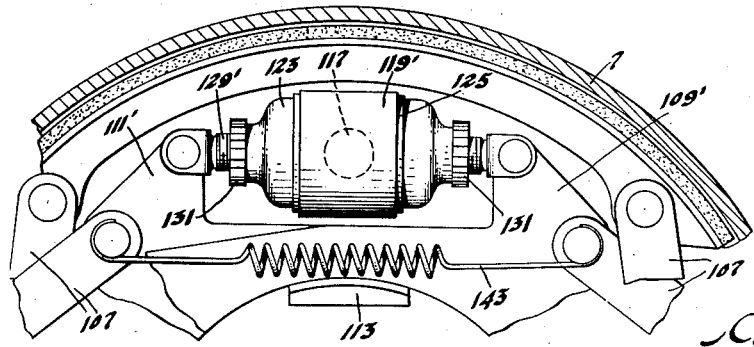
Fig. 6 is a similar view in elevation of a part of a modified form of hydraulic brake-applying means.

In Fig. 6 is shown a slight modification. The ends of the power cylinder 119' are coaxial as shown. Plates 109' and 111' are so shaped as to engage the coaxially-arranged plunger extensions 129' which in this case are shown as pivotally connected to the plates 109' and 111'. In other respects this form of the invention differs in no way from the form shown in Fig. 5, and the operation is the same as before described except that an adjustable stop must be provided, for example like that in Fig. 1.

I claim:

1. A brake drum, a plurality of shoes engaging said drum, a pair of members rotatable about the axis of the drum, link means connecting one of said members with one end of each of said shoes, and other link means connecting the other of said members with the other ends of said shoes.

2. The invention defined by claim 1 together with means to oppositely rotate said members and adapted to impart motion to one only of said members whenever the other of said members is anchored by the rotary force imparted thereto by the rotation of the drum.

3. In a brake, a drum, a plurality of shoes in number and dimension such as to occupy substantially the periphery of the drum, rotatable plate members, link means connecting one end of each shoe with one of said rotatable members, and other link means connecting the other end of each shoe with the other of said members, brake-applying means operably related to both plate members and adapted to rotate them in opposite directions.

4. The invention defined by claim 3, the rotation of said drum operable through the instrumentality of the shoes and links to rotate both plate members in the same direction whereby the rotation of one plate derived from the drum opposes the movement imparted to it by the applying means, and stop means to limit the movement of said plate member under the force derived from drum rotation and thereby render it operative to anchor one end of each shoe.

5. The invention defined by claim 3, the rotation of said drum operable through the instrumentality of the shoes and links to rotate both plate members in the same direction whereby the rotation of one plate derived from the drum opposes the movement imparted to it by the applying means, and stop means to limit the movement of said plate member under the force derived from drum rotation together with spring means to release said shoes and reversely rotate both said members into engagement with the stop means.

6. The invention defined by claim 3, the rotation of said drum operable through the instrumentality of the shoes and links to rotate both plate members in the same direction whereby the rotation of one plate derived from the drum opposes the movement imparted to it by the applying means, and stop means to limit the movement of said plate member under the force derived from drum rotation, together with spring means to release said shoes and reversely rotate both said members into engagement with the stop means, and mechanism to adjust said stop means.

7. In a brake, a drum, a plurality of shoes distributed around the inner periphery of said drum, a pair of coaxial plates, means mounting said plates for rotation, links between one plate and one of the ends of each shoe, links between the other plate and the other ends of said shoes, brake-applying means equally operable upon the plates to rotate them in opposite directions, the shoes being rotated all in the same direction by the self-actuating force from the drum, stop means to limit the motion of that one of said plates which is rotated by drum rotation against the applying force.

8. The invention defined by claim 7, said stop means being adjustable to compensate for lining wear.

9. The invention defined by claim 7, said stop being composed of parts, one for anchoring one of said plates and the other for anchoring the other of said plates, one of said parts being adjustable.

10. The invention defined by claim 7, said applying means comprising a fixed hydraulic cylinder element and oppositely acting plungers, means associated with said cylinder element to serve as a stop for the brake release movements and for the anchoring movements of the plates.

11. In combinaton, a drum, a plurality of shoes to frictionally engage the drum, rotatably mounted plate members, links between the plate members and shoes, a stop to engage both said plates in the release position of the shoes, brake-applying means to oppositely rotate said plate members to move them from the stop, the self-actuating force derived from the rotating drum operable to rotate both plates in the same direction, the stop limiting the movement of that one of said plates which is rotated by the drum in a direction opposite to the direction of the rotation imparted to it by the brake-applying means.

12. The invention defined by claim 11 together with other stops to cooperate with said first stop to limit the movement of that plate which serves to anchor the shoes when checking forward travel.

13. In a brake, a drum, a plurality of shoes, each shoe having links pivoted to each end thereof, mechanism whereby the links at either series of corresponding ends of the shoes may constitute articulating link anchorages, and brake-applying means operable through the other set of links upon the other ends of the shoes.

14. The invention defined by claim 13, said mechanism including rotatably mounted plates to which said links are pivoted, and stop means to engage said plates and to determine the position of release of the shoes and also to serve as an anchorage for the one or the other of said plates and the corresponding ends of the shoes depending upon the direction of drum rotation.

CARL A. LINDBLOM.